Figure 1:
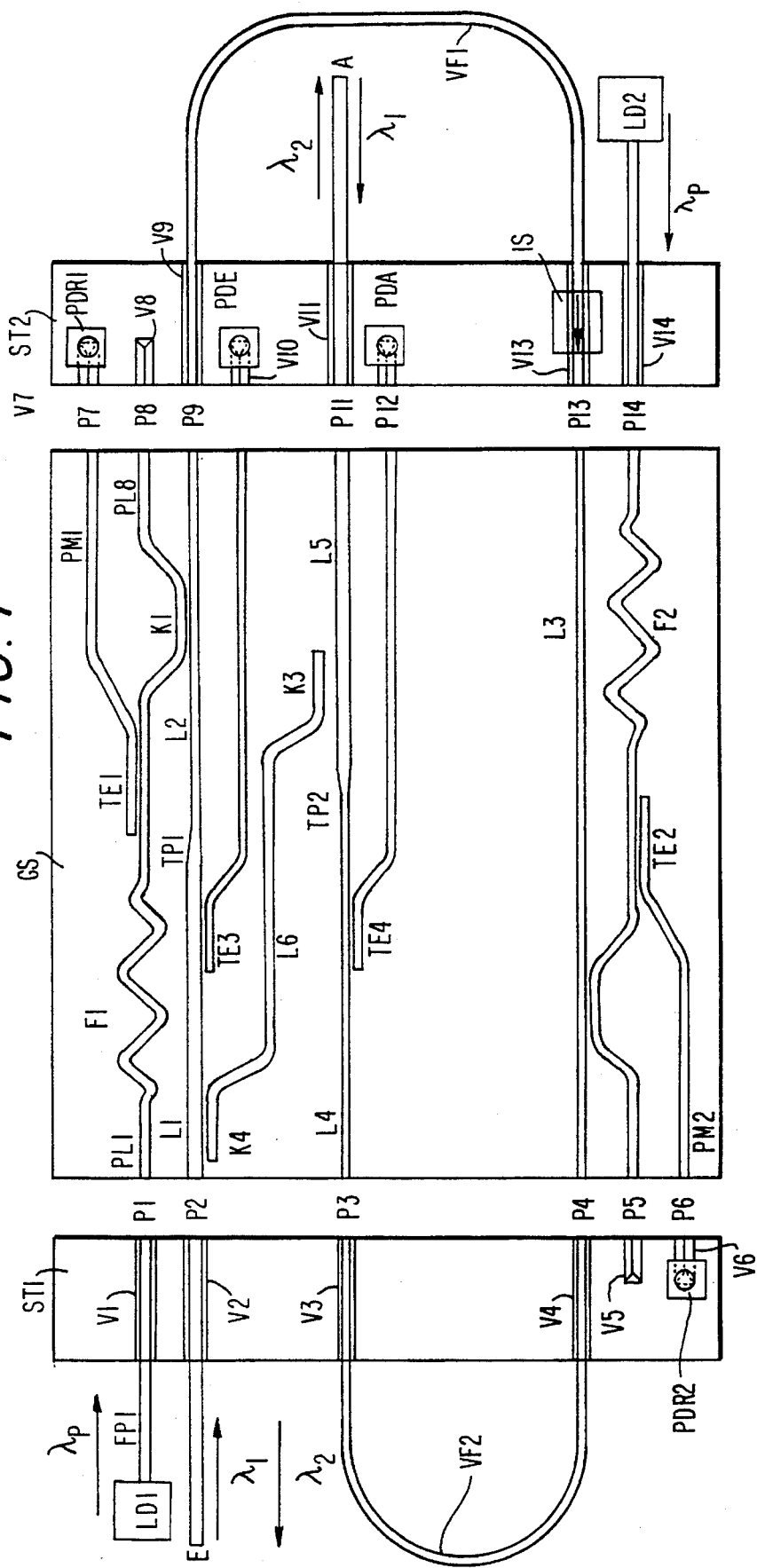

United States Patent [19]

Mueller-Fiedler et al.

[11] Patent Number: 5,579,154
[45] Date of Patent: Nov. 26, 1996

[54] OPTICAL FIBER AMPLIFIER

[75] Inventors: Roland Mueller-Fiedler, Leonberg; Heiner Hauer, Fellbach; Albrecht Kuke, Auenwald; Bernhard Schwaderer, Weissach im Tal; Ulrich Kohn, Backnang, all of Germany

[73] Assignee: ANT Nachrichtentechnik GmbH, Backnang, Germany

[21] Appl. No.: 537,243

[22] Filed: Sep. 29, 1995

[30] Foreign Application Priority Data

Oct. 13, 1994 [EP] European Pat. Off. ............. 94116138

[51] Int. Cl.⁶ .................................. H01S 3/00; G02B 6/12
[52] U.S. Cl. ........................................ 359/341; 385/14
[58] Field of Search ............................. 359/341; 385/14, 385/49, 88, 89, 90

[56] References Cited

U.S. PATENT DOCUMENTS

| | | | |
|---|---|---|---|
| 4,768,848 | 9/1988 | Vaerewyck | 350/96.12 |
| 5,381,262 | 1/1995 | Arima et al. | 359/341 |
| 5,500,763 | 3/1996 | Ota | 359/333 |

FOREIGN PATENT DOCUMENTS

| | | |
|---|---|---|
| 0440049 | 7/1991 | European Pat. Off. . |
| 0474447 | 11/1992 | European Pat. Off. . |
| 3543558 | 11/1987 | Germany . |

OTHER PUBLICATIONS

Zhang, et al "Glass Integrated Optics . . . ", vol. 33, No. 16, Applied Optics, Jun. 1, 1994.

*Primary Examiner*—Mark Hellner
*Attorney, Agent, or Firm*—Michael J. Striker

[57] ABSTRACT

The invention relates to an optical fiber amplifier having an amplification waveguide, having a pump source and having a wavelength-selective coupler. The pump light from the pump source is coupled into the amplification waveguide via the coupler. A carrier substrate (GS) is provided, on which passive (eg. couplers, dividers) and active components (eg. amplification waveguides) of the fiber amplifier are integrated. In addition, a silicon carrier (ST1) is provided, which is fitted to one end of the carrier substrate (GS). The silicon carrier (ST1) has anisotropically etched grooves with optical components. The pump source is fixed on the silicon carrier (ST1).

The optical components on silicon carrier (ST1) and carrier substrate (GS) are adjusted in relation to one another.

14 Claims, 3 Drawing Sheets

OPTICAL FIBER AMPLIFIER

The invention relates to an optical fiber amplifier having at least one amplification fiber, having at least one prop source and having at least one wavelength-selective coupler via which the pump light is coupled into the amplification fiber, and having a carrier substrate on which passive and active or only passive or only active components of the fiber amplifier are integrated.

In optical communications technology, optical fiber amplifiers are needed to compensate for conduction losses. If a signal is intended to be distributed to very many subscribers via a 1:N divider, the power per subscriber is reduced in accordance with the divider ratio. In order to maintain sufficient power for the individual subscribers or in order to be able to connect very many subscribers, optical fiber amplifiers are likewise used before the branching. A fiber amplifier has, as amplification element, a glass fiber doped with erbium, through which the light of wavelengths $\lambda_1$ which is to be amplified passes. The prop light of wavelength $\lambda_p$, which is necessary for the amplification, is coupled into the amplification fiber via a wavelength-selective coupler. For distribution systems having interactive connections, another return channel is additionally necessary from each subscriber to the transmitting station, said return channel expediently being guided in the opposite direction on the same fiber at another wavelength. The return signal must not pass through the fiber amplifier in so doing, but must be led past the latter. Further wave-length-selective couplers are necessary for this purpose. In order to control the gain, monitor diodes are necessary to measure the input light level, the output light level and the pump light power. The monitor signals must be extracted from the corresponding light conductors via branchers. It is also important that the amplified light signal is not reflected back into the transmission path, since this would lead to disturbances of the transmitting laser. All components of the fiber amplifier must there-fore be constructed in a low-reflectance manner, another optical isolator also being necessary. The pump lasers necessary for generating the pump light are also very sensitive with respect to return reflections of the amplified transmitted light and must be protected by filters. For a sufficiently high gain, a sufficiently high power density of the pump light in the amplification fiber is necessary. Very high-power pump lasers are therefore necessary, as is a thin core for the amplification fiber. A low-attenuation coupling is therefore of great importance.

It is known to realize the wavelength-selective couplers, branchers and isolators which are necessary for the optical fiber amplifier using fiber-optic components. Such components are distinguished by a low insertion attenuation and by low return reflections. Disadvantageous in the fiber-optic components is the difficult manipulation and the large requirement of space for the components themselves and the splices necessary for their connection.

For this reason, it was proposed in Guangwen Zhang, Seppo Honkanen et al.: "Glass integrated optics circuit for 1.48/1.55- and 1.30/1.55-µm-wavelength division multiplexing and ⅛ splitting" in Applied Optics, 1.6.1994, Vol. 33, No. 16, p. 3371–3374 to integrate some of the passive optical components which are necessary for the fiber amplifier together on a glass substrate, a 1:8 divider for the connection of eight subscribers also being contained on the same glass substrate. In the case of this integrated solution, however, the insertion losses are problematic, lying 2 to 5 dB higher than in the case of a fiber amplifier having fiber-optic components, measurements being made not via coupled fibers but by means of input coupling via microscope objectives.

From EP 0 440 049 B1 an optical signal amplifier for stimulated emission is known whose amplification fiber is integrated in a glass body doped with active material. In addition, couplers can also be integrated in the glass body.

Proceding from this prior art, it is the object of the invention to specify an optical fiber amplifier having integrated passive and/or active components on a carrier substrate, and enabling low-loss coupling to the integrated components.

The object is achieved by means of a fiber amplifier having the features of patent claim 1. Advantageous further developments are specified in the subclaims.

An optical fiber amplifier is specified having an amplification waveguide, having a pump source and having a wavelength-selective coupler. The pump light from the pump source is coupled into the amplification waveguide via the coupler. A carrier substrate is provided on which passive (eg. couplers, waveguides, dividers) and active components (eg. amplification waveguides) of the fiber amplifier are integrated. Furthermore, a silicon carrier is provided which is fitted to one end of the carrier substrate. The silicon carrier has anisotropically etched grooves with optical components. The pump source is fixed on the silicon carrier ST1. The optical components on silicon carrier ST1 and carrier substrate GS are adjusted in relation to one another.

The integration of passive and active components on a carrier substrate, for example an InP substrate or a glass substrate, can be advantageous for a fiber amplifier with respect to individual spliced-together fiber-optic components only if it is possible to make a simple and low-loss coupling to, for example, input and output fibers, pump lasers, etc.

An important simplification of the coupling is achieved by providing at least one silicon carrier in which anisotropically etched grooves for optical components are provided and on which optoelectronic components are integrated. Only the silicon carrier needs to be adjusted relative to the carrier substrate. A further simplification of the adjustment is achieved by means of the feature specified in patent claim 3. In the case of integration of many optical components on one carrier substrate, cross talk and back reflections should be prevented. For this purpose it is necessary in the case of branchers and wavelength-selective couplers to provide a sink for the unnecessary arm in each case, that is to say the arm must end in such a way that no light can get back.

Figure 2:
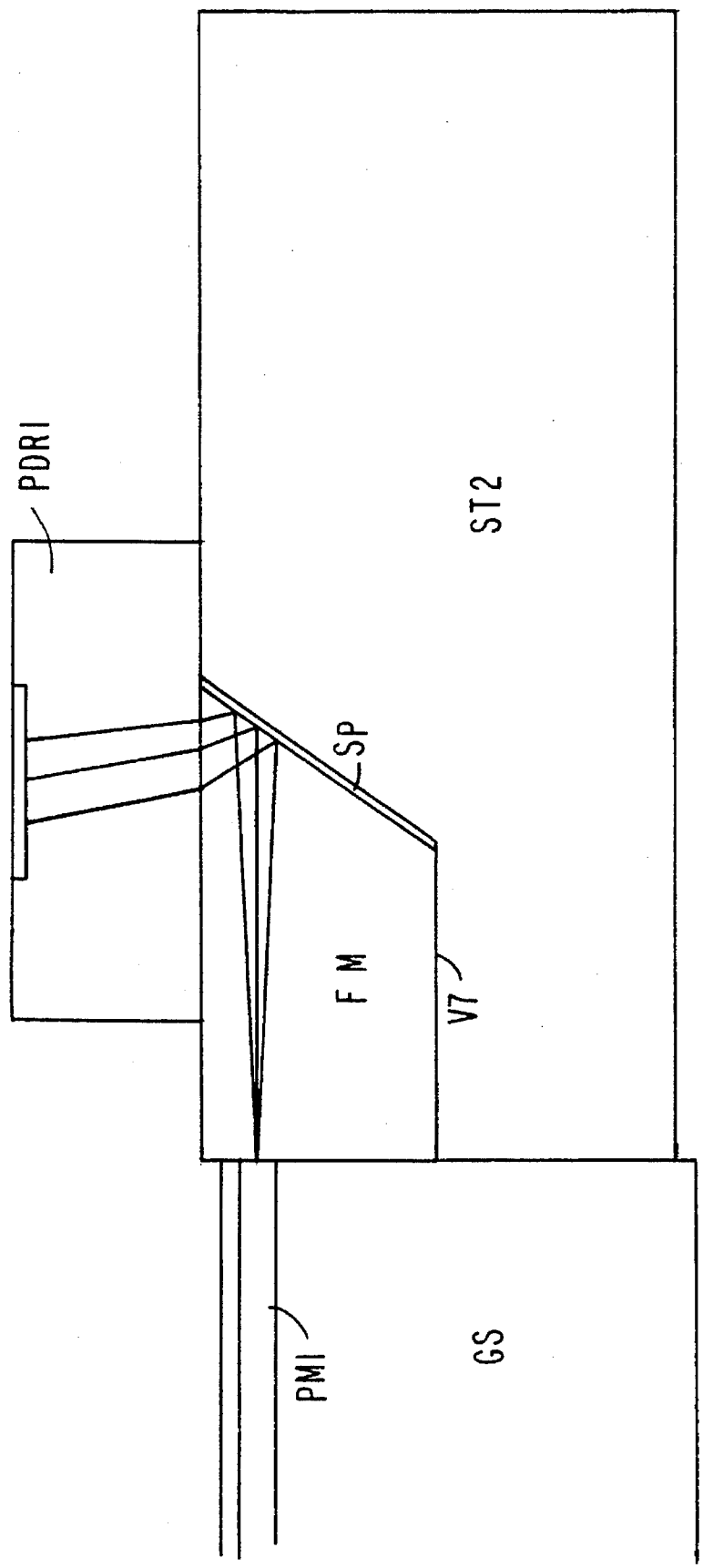
Figure 3:
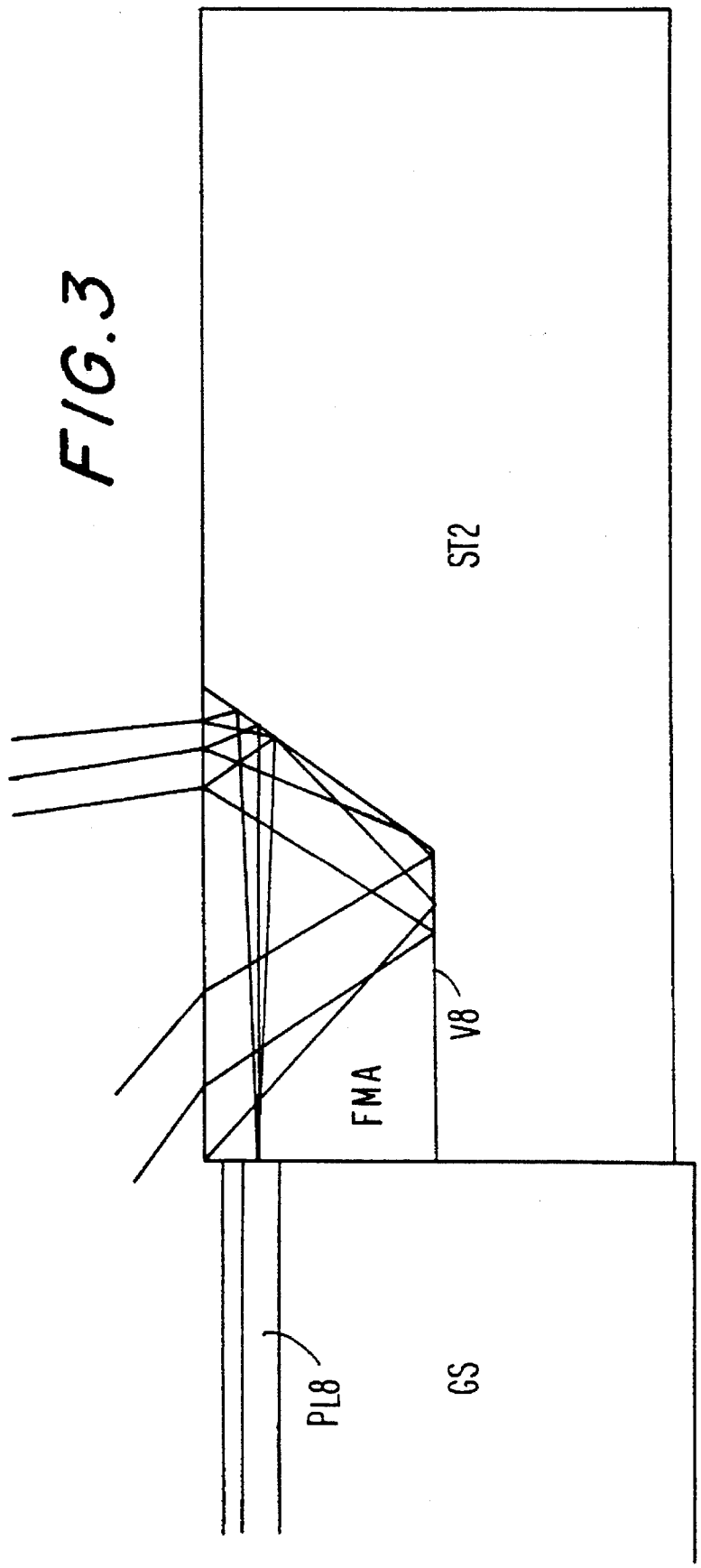

An exemplary embodiment of the invention is explained using the drawings, in which FIG. 1 shows a two-stage fiber amplifier, FIG. 2 shows the coupling of a photodiode and FIG. 3 shows the coupling of an optical sink.

FIG. I shows, as a first exemplary embodiment, a two-stage fiber amplifier having integrated optical passive components. The optical components, whose significance will be described in the following text, are produced by means of diffusion via a mask on a glass substrate GS. On the left and right ends of the glass substrate, two silicon carriers ST1 and ST2 are mounted. It is the object of these two silicon carriers to accommodate the fibers to be coupled and further optical and optoelectronic components via anisotropically etched V-grooves.

The function of the fiber amplifier according to the invention will now be explained with reference to the beam guidance and individual components. The light of wavelength $\lambda_1$, sent from the central unit to the subscribers, enters into the integrated optical waveguide L1 via the transmitting-side input fiber E, which is held in the V-groove V2 on the silicon carrier ST1, and via the port P2. The transmitted signal must transmit a very high data rate. A wavelength of 1.55 µm is normally selected for this purpose. The transmission fiber in the input E is normally a monomode fiber having a core diameter of 10 µm. The input optical waveguide 4 must therefore have a corresponding cross section in order to minimize the coupling losses. For the purposes of amplification, the transmitted signal is guided via the port P9 to a first erbium-doped amplification fiber VF1. However, as described above, the amplification fiber has a narrower core diameter of 6 µm. In order to achieve a low-loss coupling, the cross section of the integrated optical waveguide L1 is transferred into the optical waveguide L2 via the integrated taper TP1, the cross section of the optical waveguide L2 being matched to the narrower cross section of the erbium-doped amplification fiber. The light of wavelengths $\lambda_p$, needed for pumping the amplification fiber, is generated by the laser diode LD1. The fiber section FP1, which is held in the V-groove V1 on the silicon carrier ST1, is coupled into the waveguide PL1 at the port P1. This waveguide forms, according to the invention, a filter F1 by means of curves. The radii of curvature are in this case selected such that the pump light with the relatively short pump wavelengths $\lambda_p$ is guided further. In this case, a wavelength of 980 nm is selected for the pump light. The transmitted light has a wavelength of 1550 nm and the light of the return channel a wavelength of 1300 nm. Both wavelengths are stopped by the filter in the case of a suitable selection of the radii of curvature, since the longer wavelengths can no longer be guided in the curves. Such a curved filter can also be produced in a fiber-optic manner, according to the invention, by winding up the fiber FP1 over some small radii. The necessary radius of curvature of the fiber-optic or integrated curved filter according to the invention depends on the refractive index profile of the optical waveguide used and on the spacing of the wave-lengths to be separated. Such a curved filter acts as an edge filter, which is passed through by shorter wave-lengths and blocks longer wavelengths. A small proportion of the pump light is branched off in the divider TE1 and fed via the integrated optical waveguide PM1 and the port P7 into the monitor photodiode PDR1 for controlling the pump light power. According to the invention, the photodiode is mounted on the silicon carrier ST2 in a planar fashion. Underneath the photodiode there is located an anisotropically etched V-groove V2 whose side surfaces are coated with a reflective metal layer SP. That side of the groove which faces the glass substrate is open. The V-groove is filled up with a transparent filling material FM (see detail drawing in FIG. 2). The filling material, after curing, has such a hardness that it can be polished at the same time as the silicon carrier ST2 during its end-surface machining. The V-groove has, according to the invention, a cross-sectional area which is significantly greater than the cross section of the integrated optical waveguide which is to be coupled. Maladjustments between the integrated optical waveguides on the glass substrate and the V-groove therefore do not lead to a coupling loss as long as they are smaller than the difference in the lateral dimensions between the V-groove and the integrated optical waveguide. The bundle of light emerging from the optical waveguide is propagated as a free beam in the filling material FM of the V-groove V2 and, after reflection at the end face of the V-groove, is incident on the photodiode. Instead of the transparent filling material FM, the V-groove can also remain empty. The bundle of light has then a somewhat greater divergence. Likewise, a fiber can also be introduced which has a core diameter which is large in relation to the diameter of the integrated waveguide. The same coupling of photodiodes—as described above—is likewise found at the ports P5, P10 and P12.

After the divider TE1, the pump light is coupled into the waveguide L2 via the wavelength-selective coupler K1. The wavelength-selective coupler K1 is designed such that the predominant part of the pump light, at the wavelength $\lambda_p$, is coupled across and the transmitted light having the wavelength $\lambda_1$ is not coupled across. Because of technological tolerances, however, account must always be taken of the fact that a small proportion of the pump light passes into the through branch PL8 of the coupler K1. In order that this light is not reflected back at the end of the waveguide and, in so doing, disturbs the transmitting laser at the beginning of the transmitting line or disturbs the pump laser, it is necessary to avoid this reflection. This is achieved by means of an arrangement which is shown in FIG. 3. This arrangement corresponds to the arrangement in FIG. 2, with the difference that here no photodiode is fitted. The light which is incident via the V-groove is reflected away upward. The groove can either be unfilled or can be filled up with a filling material FMA whose refractive index is matched to that of the coupled waveguide PL8. To increase the attenuation of the reverse flux, the filling material can also be provided with a light-absorbing addition. The same provision of a sink is found at the port P5.

A combination of a plurality of couplers is meaningful in order to reduce the constructional length. Thus, a combination of the couplers K1 and TE1 is possible.

The transmitted light passing out of the waveguide L2 through the coupler K1, together with the pump light coupled across by the coupler K1, enters via the port P9 into the first amplification fiber VF1 and is amplified there. To avoid back reflections, an isolator IS is built into the light path. This isolator can either be a known isolator with fiber connections on both sides or, to achieve a more compact construction, it is more advantageous to integrate this isolator in the silicon carrier as well, that is to say, for example, to introduce it in individual components of the isolator in V-grooves in the silicon carrier. In the port P13, the transmitted light amplified in the first stage is coupled into the integrated waveguide L3. Pump light is coupled once more into this waveguide in the wavelength-selective coupler 13. This pump light, of wavelength $\lambda_p$, is generated in LD2. The light feed and control path is constructed just as in the case of the first pump light source.

At the port P4, the transmitted light and the pump light are coupled into a second amplification fiber VF2. The transmitted light, amplified for the second time, enters into the integrated optical waveguide L4 via the port P3. The integrated optical waveguides L2, L3 and L4 all have cross sections which are matched to the narrower cross section of the amplification fibers VF1 and VF2. In order to match the cross section once more to that of the output fiber A in the port P11, an integrated taper TP2 is provided.

The return signal from the subscriber, transmitted to the central unit in the opposite direction on the same fiber path E—A, has the wavelength $\lambda_2$, for which 1300 nm is normally selected. This light may not pass through the amplification path, since it would otherwise be attenuated there. Therefore, the return signal is caused to bypass the two amplification stages via the two wavelength-selective couplers and the waveguide L6. These components are likewise integrated on the glass substrate GS.

To monitor the input and output light level of the transmitted signal, which is necessary for controlling the gain, small parts of the transmitted light are branched off, according to the invention, via the integrated dividers TE3 and TE4, and guided to the photodiodes PDE and PDA via the integrated waveguides L65 and L7 and the ports P10 and P11.

The glass substrate GS has on both sides a plurality of ports which must all be coupled with as low an attenuation as possible and as low an adjustment outlay as possible onto the corresponding components. To achieve a low attenuation it is necessary to carry out the adjustment in an active manner. In the case of active adjustment on both sides of a substrate having integrated waveguides, the problem occurs in principle that during the adjustment of one side, the other side must be already adjusted at least coarsely. In the case of coupling integrated monomode optical waveguides to monomode fibers, very good preadjustment at the opposite port must therefore already be present. Since, in the case of the solution specified, not only the adjustment-critical waveguide-waveguide ports are provided but also the adjustment-uncritical waveguide-V-groove ports, an advantageous adjustment strategy is possible here. By means of the photolithographic generation of the V-grooves on the silicon carriers and the waveguides on the glass substrate, the opposite positions of the ports on the carriers to be coupled are already fixed with sufficient precision. The end faces to be coupled are polished flat, so that no axial offsets and tilt angle errors can occur.

The exemplary embodiment shown in FIG. 1 does not imply any restriction of the proposals described according to the invention to just this example. Variations of this exemplary embodiment can be meaningful in the sense that, instead of a two-stage fiber amplifier, only a single-stage amplifier can be used. Likewise, instead of an output fiber A, a greater number of N output fibers $A_1$ to $A_N$ can be used, the 1:N divider which is necessary for this being integrated with the glass substrate. For fiber amplifiers which are used directly after the transmitting laser in the central unit, it can be meaningful to guide the return signal of wavelength $\lambda_2$ not once more via a coupler into the input fiber E, but feed it directly in a separate output to the receiver for the return channels.

A further advantageous variant of the invention consists in the fact that the amplification waveguide is also able to be integrated in the glass substrate by means of corresponding doping with erbium.

We claim:

1. An optical fiber amplifier, comprising at least one amplification waveguide; at least one pump source; at least one wavelength-selective coupler which couples a light of said pump source into said amplification waveguide; a carrier substrate provided with a plurality of components; and at least one silicon carrier having anisotropically etched grooves in which components are fixed and in which ends of the components on said carrier substrate can be introduced, said pump source being mounted on said silicon carrier, and said silicon carrier being fitted on one end at said carrier substrate so that said components on said silicon carrier are adjusted in relation to said components on said carrier substrate.

2. An optical fiber amplifier as defined in claim 1, and further comprising further optoelectronic components mounted on said silicon carrier.

3. An optical fiber amplifier as defined in claim 1, and further comprising at least one optoelectronic converter mounted on said silicon carrier so that a light-sensitive surface of said at least one optoelectronic converter faces toward a surface of said silicon carrier, said silicon carrier having a V-groove located underneath said at least one optoelectronic converter and being reflective, said optical elements on said carrier substrate including a waveguide to be coupled to said at least one optoelectric converter, said V-groove having a cross-sectional area which is considerably greater than a cross-sectional area of said waveguide.

4. An optical fiber amplifier as defined in claim 1, wherein said amplification waveguide includes an amplification fiber; and further comprising a wavelength-selective filter provided on said carrier substrate between said pump source and said coupler for coupling the light of said pump source into said amplification fiber, said filter guiding the light of the wavelength of said pump source and not guiding a light of a transmission wavelength.

5. An optical fiber amplifier as defined in claim 4, wherein said wavelength-selective filter is a waveguide with curves.

6. An optical fiber amplifier as defined in claim 1, and further comprising a photodiode located on said silicon carrier; and a divider integrated on said carrier substrate and coupling out said part of the transmitted light or the light of said pump source which is incident via an integrated waveguide on said photodiode.

7. An optical fiber amplifier as defined in claim 1, wherein said optical elements on said carrier substrate include a waveguide having an adiabatic cross-sectional changer and integrated on said carrier substrate.

8. An optical fiber amplifier as defined in claim 7, wherein said adiabatic cross-sectional changer is a taper.

9. An optical fiber amplifier as defined in claim 1, wherein said silicon carrier has a silvered V-groove which is operative as an optical sink.

10. An optical fiber amplifier as defined in claim 1, and further comprising a second silicon carrier, said carrier substrate having two opposite ends, said silicon carriers being fitted on said opposite ends of said carrier substrate.

11. An optical fiber amplifier as defined in claim 1, wherein said silicon carrier has at least one V-groove filled with transparent filling material.

12. An optical fiber amplifier as defined in claim 1, wherein said components on said carrier substrate are passive components.

13. An optical fiber amplifier as defined in claim 1, wherein said components on said carrier substrate are active components.

14. An optical fiber amplifier as defined in claim 1, wherein said components on said carrier substrate are active components and passive components.

* * * * *